(12) United States Patent
Zhao et al.

(10) Patent No.: US 11,758,253 B2
(45) Date of Patent: Sep. 12, 2023

(54) CAMERA MODULE HAVING CHAMFER, PHOTOSENSITIVE ASSEMBLY, PREPARATION METHOD, AND ELECTRONIC DEVICE

(71) Applicant: Ningbo Sunny Opotech Co., Ltd., Zhejiang (CN)

(72) Inventors: Bojie Zhao, Zhejiang (CN); Dongli Yuan, Zhejiang (CN); Zhen Huang, Zhejiang (CN); QiMin Mei, Zhejiang (CN); Zhenyu Chen, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 0 days.

(21) Appl. No.: 17/043,381

(22) PCT Filed: Apr. 12, 2019

(86) PCT No.: PCT/CN2019/082418
§ 371 (c)(1),
(2) Date: Sep. 29, 2020

(87) PCT Pub. No.: WO2019/201167
PCT Pub. Date: Oct. 24, 2019

(65) Prior Publication Data
US 2021/0051249 A1    Feb. 18, 2021

(30) Foreign Application Priority Data

Apr. 17, 2018  (CN) .......................... 201810342290.6
Apr. 17, 2018  (CN) .......................... 201820543430.1

(51) Int. Cl.
*H04N 23/54*    (2023.01)
*H04N 23/51*    (2023.01)
(Continued)

(52) U.S. Cl.
CPC ............. *H04N 23/54* (2023.01); *G03B 17/02* (2013.01); *H04N 23/51* (2023.01); *H04N 23/55* (2023.01); *H04N 23/57* (2023.01)

(58) Field of Classification Search
None
See application file for complete search history.

(56) References Cited

U.S. PATENT DOCUMENTS

2004/0247311 A1* 12/2004 Ajiki .................... H04N 5/2253
396/535
2011/0234890 A1*  9/2011 Kobayashi ........... H04N 5/2254
348/373

(Continued)

FOREIGN PATENT DOCUMENTS

CN        1534995       10/2004
CN      101131526        5/2010
(Continued)

OTHER PUBLICATIONS

International Search Report issued Jul. 1, 2019 in International (PCT) Application No. PCT/CN2019/082418, with English translation.

*Primary Examiner* — Quan Pham
(74) *Attorney, Agent, or Firm* — Wenderoth, Lind & Ponack, L.L.P.

(57) ABSTRACT

This invention provides a camera module having a chamfer, a photosensitive assembly, a preparation method, and an electronic device. The photosensitive assembly of the camera module having the chamfer includes: a photosensitive element; a circuit board, wherein the photosensitive element is electrically connected and attached to the circuit board, and wherein the circuit board has a circuit board chamfer; and a molded body having a light window and a molded body chamfer, wherein the molded body chamfer and the circuit board chamfer are correspondingly arranged to form (Continued)

a chamfer portion suitable for forming a chamfer structure of the camera module, and wherein the molded body is molded on the circuit board and encapsulates the photosensitive element, so that the camera module may be installed at a corner of the electronic device, thereby increasing the screen-to-body ratio.

19 Claims, 13 Drawing Sheets

(51) Int. Cl.
 *H04N 23/55* (2023.01)
 *H04N 23/57* (2023.01)
 *G03B 17/02* (2021.01)

(56) References Cited

U.S. PATENT DOCUMENTS

| | | | |
|---|---|---|---|
| 2014/0293101 A1 | 10/2014 | Kim | |
| 2016/0043122 A1* | 2/2016 | Fujimori | H01L 27/14623 257/433 |
| 2016/0062213 A1* | 3/2016 | Rammah | G02B 7/003 396/535 |
| 2016/0182772 A1* | 6/2016 | Luo | H04N 5/2257 348/373 |
| 2016/0197113 A1* | 7/2016 | Wong | H01L 27/14618 257/432 |
| 2017/0134628 A1* | 5/2017 | Hwang | H04N 5/2254 |
| 2017/0272635 A1* | 9/2017 | Wang | H04N 13/239 |
| 2017/0285292 A1 | 10/2017 | Chen | |
| 2017/0351164 A1* | 12/2017 | Kim | H04N 5/2254 |
| 2018/0176346 A1* | 6/2018 | Wei | G06F 1/1658 |
| 2019/0199894 A1* | 6/2019 | Ma | H04N 5/22521 |
| 2019/0320096 A1* | 10/2019 | Chen | G03B 17/02 |
| 2020/0236263 A1* | 7/2020 | Ha | G02B 7/08 |

FOREIGN PATENT DOCUMENTS

| | | |
|---|---|---|
| CN | 203674192 | 6/2014 |
| CN | 105762159 | 7/2016 |
| CN | 107466159 | 12/2017 |
| CN | 107734215 | 2/2018 |
| CN | 207010794 | 2/2018 |
| CN | 208299887 | 12/2018 |
| JP | H0961694 A * | 8/1995 |

* cited by examiner

A-A

B-B

C-C

CAMERA MODULE HAVING CHAMFER, PHOTOSENSITIVE ASSEMBLY, PREPARATION METHOD, AND ELECTRONIC DEVICE

TECHNICAL FIELD

The present invention relates to field of camera modules, and in particular to a camera module having a chamfer, a photosensitive assembly, a preparation method and an electronic device; wherein the chamfer of the camera module adapts to the corner shape of the electronic device, so that it may be installed at a corner of the electronic device to increase the screen-to-body ratio.

BACKGROUND TECHNIQUE

The increasing popularity of smart devices has become a part of people's lives, and people's requirements for smart devices are getting higher and higher. Thinner and full screen are two main development directions of electronic devices. As an "eyes" of the electronic device, camera modules also need to adapt to the mainstream development direction, which is mainly manifested in the trends of multi-function integration, light and thin, and miniaturization. On one hand, the miniaturization of camera modules is to make electronic devices thinner and lighter; and on the other hand, it is to make room for the display screen to achieve a full screen, especially for current front camera of the electronic device (such as a mobile phone) occupies screen space and hinders the development of the full screen.

A common design currently on the market is to arrange the front camera module in center of the electronic device and close to top edge thereof, thereby increasing the screen-to-body ratio of the mobile phone. Alternatively, just a part of the module area is left in the center of the top of the screen of the mobile phone, which is now called "straight bangs."

Therefore, manufacturers need to face a problem of how to make the front camera module closer to the top edge of the mobile phone, i.e., how to further reduce a longitudinal size of the camera module (the size along a long side of the mobile phone), and further solve the technical problem of full screen. The small size of the current camera module has reached its limit and it is difficult to be further shrink. The reason is that the traditional camera module is based on a COB (chip on board) process, and lens and lens carrier are supported on a photosensitive path of a photosensitive assembly by a lens holder. Due to limitation of forming accuracy of the lens holder, and the need to ensure bearing strength, a wall thickness of the lens holder cannot be further reduced. Further, a certain safety distance needs to be reserved between the lens holder and other internal components (such as electronic components, gold wires, and chips). At the same time, it is necessary to reserve a little gap between the gold wire and the chip, and between the electronic components and the gold wire. In summary, the various factors mentioned above have become the limitation of further reduction in the size of the camera module.

Therefore, the current market urgently needs a new technology to solve the problem of full-screen electronic devices.

CONTENTS OF THE INVENTION

An object of the present invention is to provide a camera module having a chamfer, a photosensitive assembly, a preparation method, and an electronic device, wherein the camera module is suitable for being installed at a corner of a frame of the electronic device to make room for a screen, thereby increasing the screen-to-body ratio.

Another object of the present invention is to provide a camera module having a chamfer, a photosensitive assembly, a preparation method and an electronic device, wherein a shape of a chamfer portion of the camera module matches a shape of a corner of the frame of the electronic device such as a mobile phone, so that the camera module is more suitable for being installed at the corner of the electronic device, and may be closer to the corner of the mobile phone than a traditional square camera module, thereby improving the screen-to-body ratio and giving better user experience.

Another object of the present invention is to provide a camera module having a chamfer portion, a photosensitive assembly, a preparation method and an electronic device, wherein the electronic components of the camera module are arranged on an edge portion away from the chamfer portion, so that it is convenient for a photosensitive assembly of the camera module to form the chamfer.

Another object of the present invention is to provide a camera module having a chamfer, a photosensitive assembly, a preparation method, and an electronic device, wherein the electronic components are arranged on one side area and/or a corner edge area of the photosensitive assembly, so that the photosensitive elements may be attached to an upper part of a circuit board, i.e., a top area of the photosensitive assembly is narrower than other areas.

Another object of the present invention is to provide a camera module having a chamfer, a photosensitive assembly, a preparation method and an electronic device, wherein the top area of the photosensitive assembly is narrower than other areas, and wherein optical lens may be closer to a top side wall of the electronic device, thereby increasing the screen-to-body ratio.

Another object of the present invention is to provide a camera module having a chamfer, a photosensitive assembly, a preparation method, and an electronic device, wherein the electronic components are arranged at the corner edge area, so that the photosensitive element may be obliquely attached to the circuit board, i.e., the top area and the side area of the photosensitive assembly are narrower than other areas at this time.

Another object of the present invention is to provide a camera module having a chamfer, a photosensitive assembly, a preparation method and an electronic device, wherein the top area and the side area of the photosensitive assembly are narrower than other areas, and wherein the optical lens may be closer to two side walls of the corner of the frame of the electronic device, thereby increasing the screen-to-body ratio.

Another object of the present invention is to provide a camera module having a chamfer, a photosensitive assembly, a preparation method, and an electronic device, wherein the electronic components are arranged on the edge portion to make room for the chamfer portion, to facilitate a formation of the chamfer portion.

Another object of the present invention is to provide a camera module having a chamfer, a photosensitive assembly, a preparation method, and an electronic device, wherein the chamfer portion is implemented as a round chamfer, so as to fit with a design of most existing electronic devices with round corners of four corners and meet market needs; compared with a traditional square camera module, it may be closer to the round corners of the electronic devices such as mobile phones.

Another object of the present invention is to provide a camera module having a chamfer, a photosensitive assembly, a preparation method, and an electronic device, wherein the chamfer portion may be designed to have a shape such as an inclined side, so as to adapt to the shapes of the corner of different electronic devices.

Another object of the present invention is to provide a camera module having a chamfer, a photosensitive assembly, a preparation method, and an electronic device, wherein the camera module has two round chamfer portions which are diagonally arranged at diagonal corners of the camera module, so that butt joint corners between the screen of the electronic device and the camera module are round corners, thereby increasing the area of the screen and the screen-to-body ratio.

Another object of the present invention is to provide a camera module having a chamfer, a photosensitive assembly, a preparation method, and an electronic device, wherein an outer edge of the optical lens without chamfer is located at inside of an outer edge of a molded body chamfer of a molded body, no additional chamfering process is required for the optical lens, thereby saving process steps.

Another object of the present invention is to provide a camera module having a chamfer, a photosensitive assembly, a preparation method and an electronic device, wherein if the outer edge of the optical lens without chamfer is located at inside of the outer edge of the molded body chamfer, a second chamfer portion is arranged at a corner of the photosensitive assembly to adapt to the shape of the corner of the electronic device.

Another object of the present invention is to provide a camera module having a chamfer, a photosensitive assembly, a preparation method, and an electronic device, wherein if the outer edge of the optical lens without chamfer is located at outside of the edge of the molded body chamfer, the optical lens needs chamfering process to form the second chamfer portion.

Another object of the present invention is to provide a camera module having a chamfer, a photosensitive assembly, a preparation method, and an electronic device, wherein arranged positions, shapes and sizes of the second chamfer portion of the optical lens and a first chamfer of the photosensitive assembly are the same so as to form the chamfer portion.

Another object of the present invention is to provide a camera module having a chamfer, a photosensitive assembly, a preparation method, and an electronic device, wherein an adjacent side of the second chamfer portion of the optical lens is implemented as a straight side to attach to adjacent side walls at a corner of the electronic device, thereby increasing the screen-to-body ratio.

Another object of the present invention is to provide a camera module having a chamfer portion, a photosensitive assembly, a preparation method, and an electronic device, wherein the camera module uses a molding process to mold and encapsulate the molded body in a non-photosensitive area of a photosensitive element, occupying less space and reducing the size of the camera module as compared with a non-overlapping arrangement of the components in prior art, thereby simultaneously achieving goals of miniaturization and full-screen.

Another object of the present invention is to provide a camera module having a chamfer, a photosensitive assembly, a preparation method, and an electronic device, wherein a photosensitive assembly jointed panel is molded through a jointed panel process, and the photosensitive assembly jointed panel is cut and divided into individual photosensitive assembly monomers without chamfer, a first chamfer portion of the photosensitive assembly is formed by cutting one by one, or cutting uniformly.

Another object of the present invention is to provide a camera module having a chamfer, a photosensitive assembly, a preparation method and an electronic device, wherein a manufacturer may use an existing mold to produce the photosensitive assembly, and then form the chamfer by cutting, etc., thereby reducing the cost of remaking the mold.

Another object of the present invention is to provide a camera module having a chamfer, a photosensitive assembly, a preparation method, and an electronic device, wherein the molded body chamfer of the molded body of the photosensitive assembly is molded by a mold arranged with a chamfer, and the circuit board chamfer is formed by removing unwanted part from one side of the molded body by using a pressing force of molding, a laser cutting and other processes.

Another object of the present invention is to provide a camera module having a chamfer, a photosensitive assembly, a preparation method, and an electronic device, wherein the molded body chamfer is molded by using a mold arranged with a chamfer, and the circuit board chamfer is formed by removing unwanted part from a bottom side of the circuit board by using a cutting process.

Another object of the present invention is to provide a camera module having a chamfer, a photosensitive assembly, a preparation method and an electronic device, wherein an outer edge of the molded body chamfer is located at inside of an edge of the circuit board chamfer, so as to avoid affecting internal structure of the photosensitive assembly when the circuit board is cut by laser, and to prevent cutting the molding material and causing it to sputter, thereby affecting the appearance.

Another object of the present invention is to provide a camera module having a chamfer, a photosensitive assembly, a preparation method, and an electronic device, wherein the circuit board chamfer is formed by removing unwanted part from a bottom side area of the circuit board by a cutting process, so that the outer edge of the molded body chamfer is located at outside of the edge of the circuit board chamfer, so that the chamfer portion is closer to the corner of the electronic device.

Another object of the present invention is to provide a camera module having a chamfer, a photosensitive assembly, a preparation method and an electronic device, wherein the outer edge of the molded body chamfer is located at outside of the edge of the circuit board chamfer, so as to avoid conflicting between the camera module and the frame or a curved back shell of the electronic device.

In order to achieve at least one of the above objectives, according to one aspect of the present invention, the present invention provides a photosensitive assembly having a chamfer suitable for a camera module, including:

a photosensitive element;

a circuit board, wherein the photosensitive element is electrically connected and attached to the circuit board, and wherein the circuit board has a circuit board chamfer; and a molded body, wherein the molded body has a light window providing a light path for the photosensitive element and a molded body chamfer, wherein the molded body chamfer and the circuit board chamfer correspondingly arranged to form a first chamfer portion so as to form a chamfer structure of the camera module, and wherein the molded body is molded on the circuit board and encapsulates the photosensitive element.

In an embodiment of the present invention, the molded body encapsulates a non-photosensitive area of the photosensitive element, and the photosensitive element is integrally encapsulated on the circuit board.

In an embodiment of the present invention, positions for arranging the circuit board chamfer and the molded body chamfer correspond to each other, wherein an outer edge of the circuit board chamfer is located at inside of an outer edge of the molded body chamfer, and wherein the circuit board chamfer and the molded body chamfer form the first chamfer portion.

In an embodiment of the present invention, positions for arranging the circuit board chamfer and the molded body chamfer and their shapes correspond to each other, wherein the outer edges of the circuit board chamfer and the molded body chamfer are flush with each other, and wherein the circuit board chamfer and the molded body chamfer form the first chamfer portion.

In an embodiment of the present invention, positions for arranging the circuit board chamfer and the molded body chamfer correspond to each other, wherein the outer edge of the circuit board chamfer is located at outside of the outer edge of the molded body chamfer, and wherein the circuit board chamfer and the molded body chamfer form the first chamfer portion.

In an embodiment of the present invention, when the outer edge of the circuit board chamfer is located at outside of the outer edge of the molded body chamfer, a distance between the outer edge of the circuit board chamfer and the outer edge of the molded body chamfer is 0.01-0.5 mm.

In an embodiment of the present invention, the first chamfer portion is correspondingly implemented as a round chamfer.

In an embodiment of the present invention, the first chamfer portion is correspondingly implemented as a bevel edge.

In an embodiment of the present invention, the photosensitive assembly has two first chamfer portions, wherein the first chamfer portions are respectively arranged at two opposite corners of the camera module.

In an embodiment of the present invention, the photosensitive assembly further includes a series of electronic components, wherein the electronic components are electrically connected to the circuit board, and the molded body encapsulates the electronic components on the circuit board.

In an embodiment of the present invention, the circuit board and the molded body correspondingly have a circuit board edge portion and a molded body edge portion to form an edge portion, wherein an area formed by the edge portion and the first chamfer portion is defined by the outer edge of the photosensitive element and the edge of the circuit board, and wherein the electronic components are electrically connected to and installed at the circuit board edge portion, and the molded body edge portion encapsulates the electronic component on the circuit board edge portion.

In an embodiment of the present invention, a top outer edge of the circuit board edge portion is located at inside of a top outer edge of the molded body edge portion.

In an embodiment of the present invention, a side outer edge of the circuit board edge portion is located at inside of a side outer edge of the molded body edge portion.

In an embodiment of the present invention, the edge portion has a top area, a side area, and a corner edge area, wherein adjacent ends of the top area and the side area are connected in a chamfered manner to form the first chamfer portion, and wherein a width of the top area is narrower than a width of the side area and the corner edge area, and the electronic components are installed at the side area and/or the corner edge area.

In an embodiment of the present invention, the edge portion has a top area, a side area, and a corner edge area, wherein a width of the top area and the side area is narrower than a width of the corner edge area, and the electronic components are installed at the corner edge area.

In an embodiment of the present invention, a minimum equivalent radius value of the first chamfer portion is greater than zero and less than or equal to 50 mm.

In an embodiment of the present invention, an angle range θ value of the first chamfer portion is greater than or equal to 30° and less than or equal to 150°.

According to another aspect of the present invention, the present invention further provides a camera module having a chamfer and suitable for an electronic device, including:

at least one chamfer portion suitable for being installed at a corner of a frame of the electronic device;

an optical assembly; and a photosensitive assembly as described above, wherein the first chamfer portion is used to form the chamfer portion, and the molded body supports the optical assembly corresponding to the photosensitive path of the photosensitive element.

In an embodiment of the present invention, the optical assembly includes an optical lens, and wherein the optical lens is supported by the optical assembly on the photosensitive path of the photosensitive element.

In an embodiment of the present invention, the optical assembly further includes a light-transmitting element, and wherein the light-transmitting element is supported by the molded body and located between the photosensitive element and the optical lens, and corresponds to the photosensitive path of the photosensitive element.

In an embodiment of the present invention, the optical lens is implemented as a cylindrical shape.

In an embodiment of the present invention, the optical lens has a second chamfer portion, wherein shapes, positions and sizes of the first chamfer portion and the second chamfer portion correspond to each other to form the chamfer portion.

In an embodiment of the present invention, one of two adjacent sides of the second chamfer portion is implemented as a straight side, so that the second chamfer portion is attached to a side wall of the corner of the electronic device.

In an embodiment of the present invention, the two adjacent sides of the second chamfer portion are implemented as straight sides, so that the second chamfer portion is attached to two side walls of the corner of the electronic device.

In an embodiment of the present invention, the optical assembly further includes an installation surface, and wherein the installation surface is arranged on a bottom surface of the optical lens, and the installation surface is installed at top of the molded body.

In an embodiment of the present invention, the installation surface has an installation chamfer, wherein the installation chamfer is formed on the installation surface chamfer corresponding to the position of the molded body chamfer.

According to another aspect of the present invention, the present invention further provides an electronic device, including:

a device body; and a camera module having a chamfer as described above, wherein the camera module is installed at a corner of the device body.

According to another aspect of the present invention, the present invention further provides a preparation method of a photosensitive assembly suitable for a camera module having a chamfer, including steps of:

(a) molding a plurality of photosensitive elements on a corresponding circuit board to form a photosensitive assembly jointed panel;

(b) cutting the photosensitive assembly jointed panel to form a plurality of photosensitive assembly monomers; and (c) forming a first chamfer portion at a corner of the photosensitive assembly monomer.

In an embodiment of the present invention, the step (c) further includes steps of:

(d) placing cutting lines of a plurality of the photosensitive assembly monomers at a same straight line; and (e) uniformly cutting the placed photosensitive assembly monomers.

In an embodiment of the present invention, in step (a), the photosensitive assembly jointed panel is formed by molding with a mold having a chamfer.

In an embodiment of the present invention, step (c) further includes a step of: cutting the photosensitive assembly monomers one by one to form the first chamfer portion.

In an embodiment of the present invention, the molded body of the photosensitive assembly monomer in step (b) has a molded body chamfer, wherein an outer edge of the molded body chamfer is located at inside of an edge of a corner of the circuit board.

In an embodiment of the present invention, step (c) further includes steps of:

(f) cutting the circuit board from a front face of the circuit board to form a circuit board chamfer corresponding to the molded body chamfer.

In an embodiment of the present invention, in step (f), the outer edge of the molded body chamfer is located at inside of the outer edge of the circuit board chamfer.

In an embodiment of the present invention, step (c) further includes a step of:

(g) cutting the circuit board from a back face of the circuit board along a cutting line according to a predetermined cutting depth to form a circuit board chamfer corresponding to molded body chamfer.

In an embodiment of the present invention, an outer edge of the circuit board chamfer is flush with the outer edge of the molded body chamfer.

In an embodiment of the present invention, the outer edge of the circuit board chamfer is located at inside of the edge of the molded body chamfer.

In an embodiment of the present invention, the preparation method further includes a step of:

(h) cutting top and side edges of the circuit board from the back face of the circuit board along a predetermined cutting line.

In an embodiment of the present invention, a transition portion is arranged between adjacent molds for spacing adjacent molded bodies.

According to another aspect of the present invention, the present invention further provides a preparation method of a photosensitive assembly suitable for a camera module having a chamfer, including steps of:

(j) using a mold having a chamfer to mold a plurality of molded bodies on a circuit board with corresponding circuit board chamfer, wherein an outer edge of the mold chamfer is located at inside of an outer edge of the circuit board chamfer; and (k) cutting the photosensitive assembly jointed panel to form a plurality of photosensitive assembly monomers, wherein a first chamfer portion is formed by the circuit board chamfer and the molded body chamfer of the photosensitive assembly monomer.

In an embodiment of the present invention, in step (j), the molded body encapsulates a non-photosensitive area of a photosensitive element, wherein the photosensitive element is attached to the circuit board.

In an embodiment of the present invention, in step (j), the molded body is molded on the circuit board to surround a photosensitive element.

DETAILED DESCRIPTION OF THE EMBODIMENTS

Figure 1:
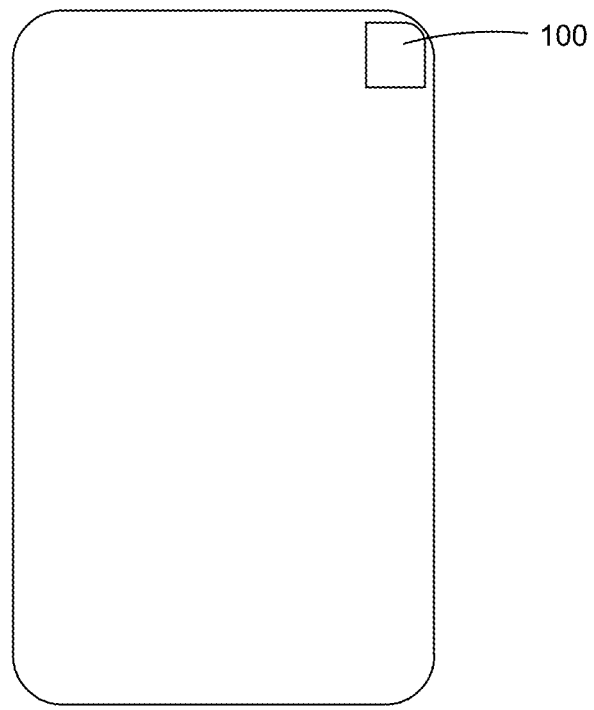
FIG. 1 is a schematic structural diagram of an electronic device according to the present invention, illustrating a schematic structural diagram of a camera module having a chamfer according to the present invention being installed at a corner of the electronic device.
Figure 2:
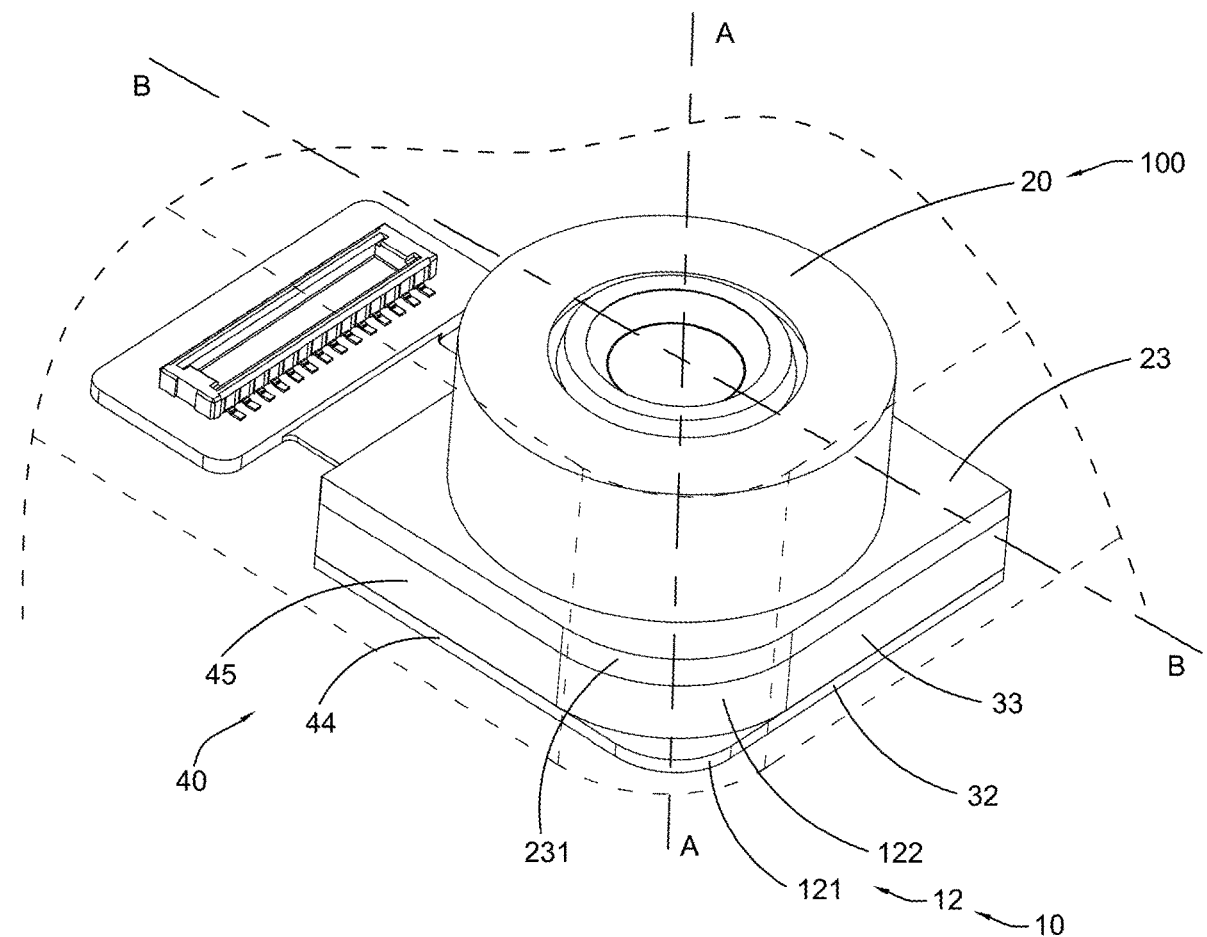
FIG. 2 is a perspective view of a camera module according to a first embodiment of the invention.
Figure 3:
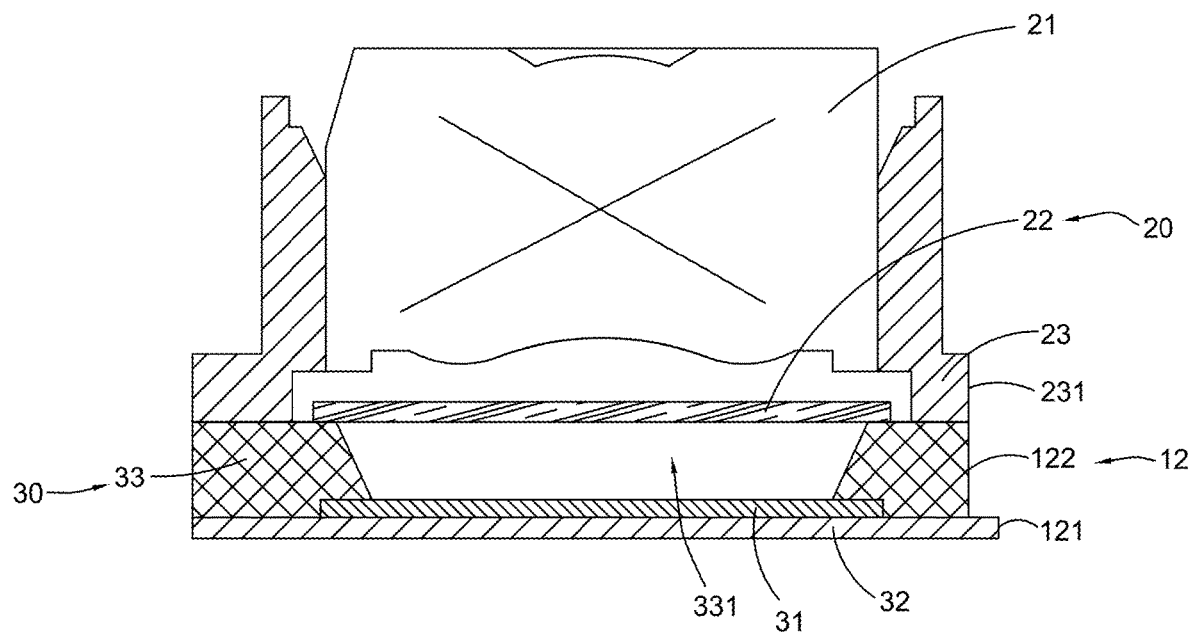
FIG. 3 is a schematic structural diagram of the camera module according to the above first embodiment of the present invention.
Figure 4:
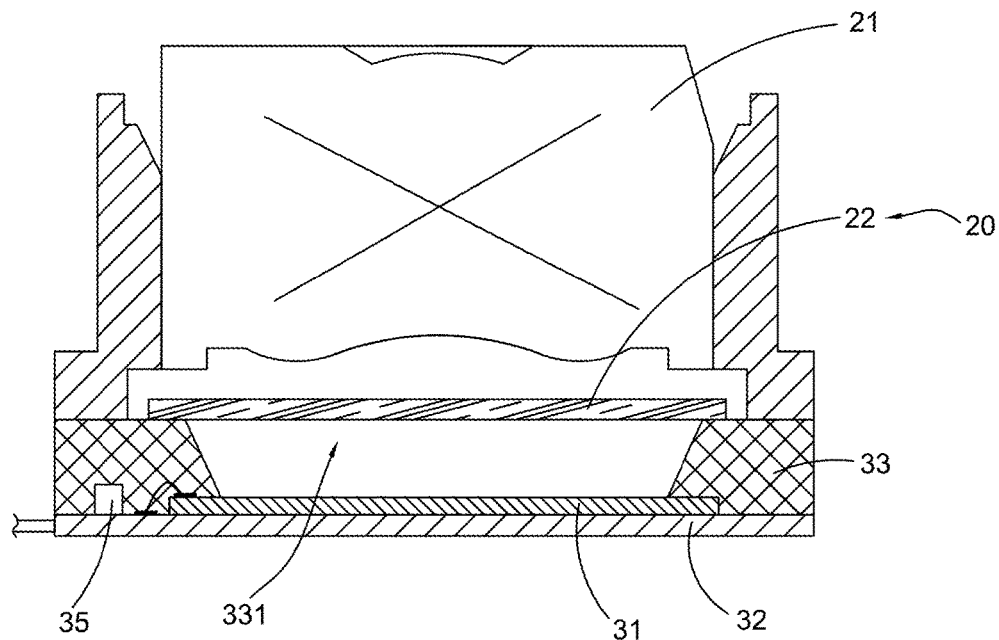
FIG. 4 is a schematic structural diagram of the camera module according to the above first embodiment of the present invention.
Figure 5:
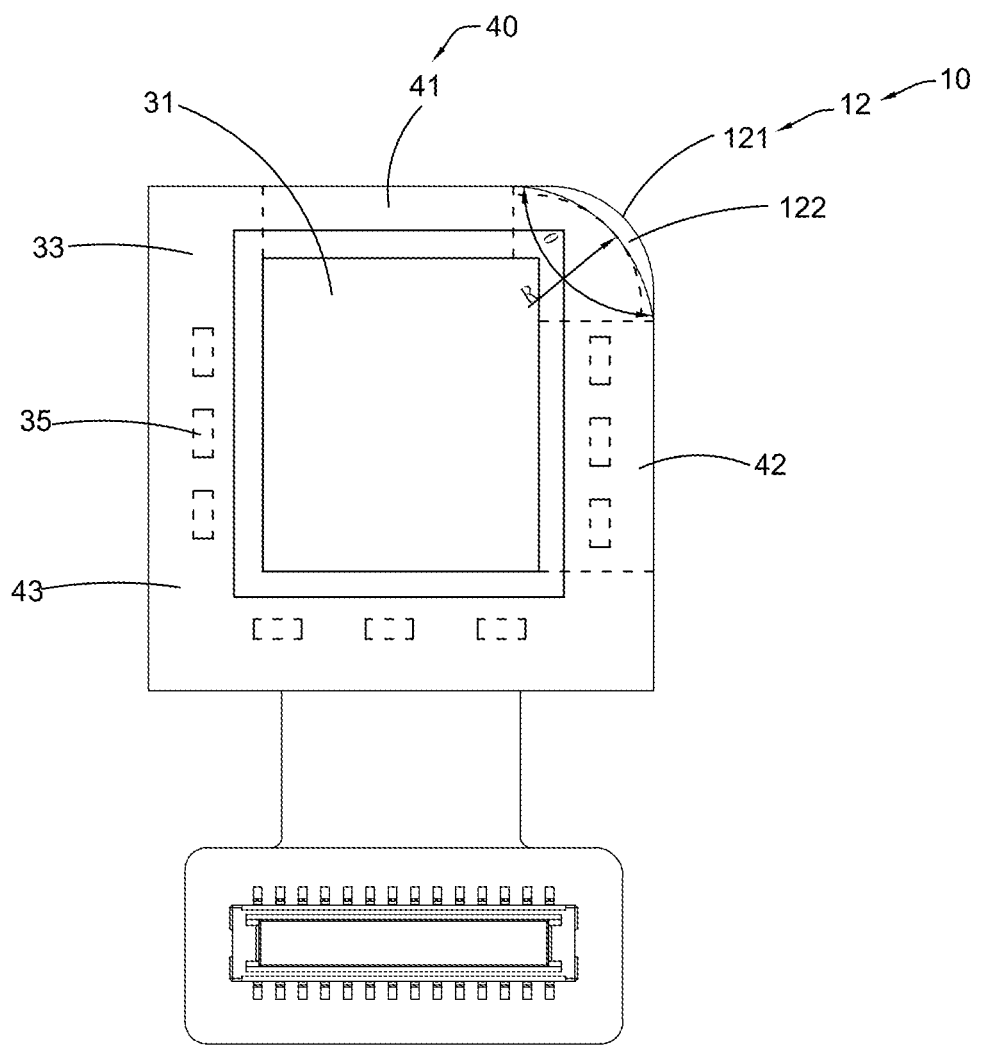
FIG. 5 is a top view of a photosensitive assembly of the camera module according to the above first embodiment of the present invention.

The following description is used to disclose the present invention so that those skilled in the art may implement the present invention. The preferred embodiments in the following description are only examples, and those skilled in the art may think of other obvious variations. The basic principles of the present invention defined in the following description may be applied to other embodiments, modifications, improvements, equivalents, and other technical solutions that do not depart from the spirit and scope of the present invention.

Those skilled in the art should understand that in the disclosure of the present invention, the orientation or positional relationship indicated by the terms "longitudinal", "transverse", "upper", "lower", "front", "rear/back", "left", "right", "vertical", "horizontal", "top", "bottom", "inner", "outer" or the like is based on the orientation or positional relationship shown in the drawings, which is only for the convenience of describing the present invention and simplifying the description, rather than indicating or implying that the mentioned device or element must have a specific orientation, be constructed and operated in a specific orientation, thus the above terms should not be understood as limiting the present invention.

It may be understood that the term "a/an" should be understood as "at least one" or "one or more", i.e., in one embodiment, the number of an element may be one, and in another embodiment, the number of the element may be more than one, and the term "a/an" cannot be understood as a restriction on the number.

As shown in FIGS. 1-11, the present invention provides a camera module having a chamfer, a preparation method, and an electronic device, wherein a series of electronic components 35 of the camera module are installed at an edge portion 40 to make room for formation of a chamfer portion 10, so that the camera module 100 is convenient to form the chamfer portion 10 matching a shape of a corner of the electronic device frame, so that the camera module 100 is suitable for being installed at the corner of the electronic device.

The chamfer portion 10 is arranged to adapt to a chamfer design of the surrounding corners of the electronic devices that are increasingly popular in current market, especially a round chamfer design. The corners of the electronic device in a shape of round chamfer are for the sake of multiple considerations, such as increasing the aesthetics, improving the cushioning effect when collision with each top corner occurs, and reducing the possibility of scratching the user by a sharp corner. If a square camera module is still used, its shape does not match the shape of the corners, and there is still a large area of blank space, which cannot achieve a higher screen-to-body ratio. Preferably, the chamfer portion 10 is implemented as a round chamfer to adapt to the round corner of the electronic device.

Figure 6:
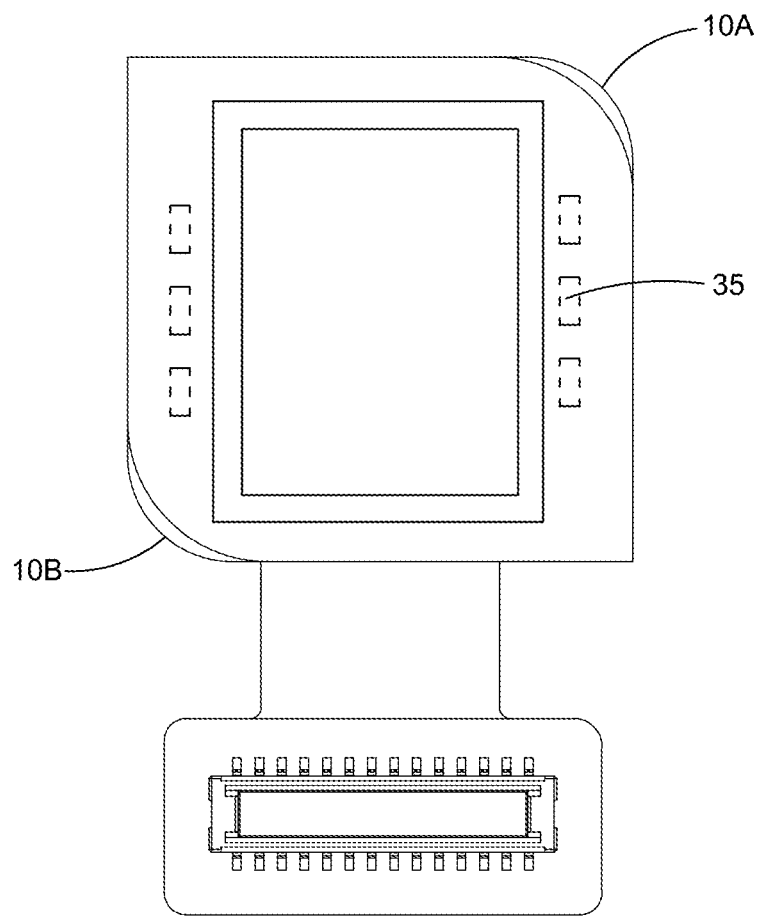
FIG. 6 is a top view of a photosensitive assembly of another embodiment of a camera module according to the present invention.

In an embodiment of the present invention, the camera module 100 may have a plurality of chamfer portions 10, so as to adapt to the requirement that the camera module 100 is installed at different corners of the electronic device, and to a certain extent it also reduces volume and size of the camera module 100. Optionally, the camera module 100 has two round chamfer portions 10A and 10B, wherein the chamfer portions 10A and 10B are diagonally arranged at two opposite corners of the camera module 100 respectively, as shown in FIG. 6, butt joint corners of a screen of the electronic device and the camera module 100 are round corners, so that the corners of the screen are smoothly transitioned to facilitate docking installation. On the other hand, it may increase area of the screen, thereby increasing the screen-to-body ratio.

In the present invention, the camera module 100 is installed at an upper right corner of the electronic device as an example for description, and it is not a limitation. Those skilled in the art should understand that the camera module 100 may also be installed at an upper left corner or other corners of the electronic device, the embodiments and features of the present invention are also applicable for the above description, and the details will not be repeated here.

Particularly, the camera module 100 includes an optical assembly 20 and a photosensitive assembly 30, wherein the optical assembly 20 is fixed to a photosensitive path of the photosensitive assembly 30, so that the photosensitive assembly 30 receives image information and forms an image.

The optical assembly 20 includes an optical lens 21, and/or a light-transmitting element 22; wherein the light-transmitting element 22 filters light collected by the optical lens 21. The optical lens 21 may be, but is not limited to, an integrated optical lens, a split optical lens, a bare lens, or an optical lens including a lens barrel, etc., and is not limited by the present invention. The light-transmitting element 22 may be implemented as an infrared filter, an ultraviolet filter, blue glass, or the like. It is understandable that the light-transmitting element 22 may also be a visible light color filter that filters out visible light, so as to be suitable for an infrared camera module that receives infrared light. Those skilled in the art may adopt other methods to protect the light-transmitting element 22, for example, the light-transmitting element 22 is implemented as a filter film coated on the photosensitive element 31, and other technical solutions, which will not be repeated here.

The photosensitive assembly 30 includes a photosensitive element 31, a circuit board 32, and a molded body 33, wherein the photosensitive element 31 is electrically connected and attached to the circuit board 32, and the molded body 33 is integrally formed on the circuit board 32 through a molding process, so as to encapsulate the photosensitive element 31 for supporting the optical assembly 20. In an embodiment of the present invention, the camera module 100 is a MOC camera module, i.e., the molded body 33 encapsulates a non-photosensitive area of the photosensitive element 31, and integrally encapsulates the photosensitive element 31 and the electronic components 35 on the circuit board 32. The molded body 33 has a light window 331 providing a light path for the photosensitive element. It is understandable that the camera module 100 may also be a MOB camera module, i.e., the molded body 33 does not encapsulate the photosensitive element 31, but only encapsulates the electronic components 35 and the circuit board 32. In other words, the molded body 33 may encapsulate the photosensitive element 31 by encapsulating it in the non-photosensitive area of the photosensitive element 31, or by encapsulating the electronic components 35 and surrounding peripheral side of the photosensitive element 31.

Compared with a non-overlapping arrangement of the components in prior art, the photosensitive assembly 30 in the present invention occupies less space and reduces size of the camera module, thereby simultaneously achieving goals of miniaturization and full-screen.

Further, the photosensitive assembly 30 has an edge portion 40 and a first chamfer portion 12, wherein an area formed by the edge portion 40 and the first chamfer portion 12 is defined by an outer edge of the photosensitive chip 31 and an edge of the circuit board 32. The first chamfer portion 12 is arranged at a corner of the formed area, i.e., the corner of the photosensitive assembly 30, so as to adapt to shape of the corner of the electronic device, wherein the edge portion 40 is implemented as a corner edge and/or corner connected to the first chamfer portion 12.

In order to implement the edge portion 40, the circuit board 32 and the molded body 33 correspondingly have a circuit board edge portion 44 and a molded body edge portion 45, wherein the circuit board edge portion 44 is used for installing the electronic components 35, the molded body edge portion 45 encapsulates the electronic components 35 on the circuit board edge portion 44. Positions of the circuit board edge portion 44 and the molded body edge portion 45 are correspondingly the same. Those skilled in the art may know the formation and arrangement of the corners and edge part of the corners of the edge portion 40, and it will not be repeated here.

Correspondingly, the circuit board 32 and the molded body 33 respectively have a circuit board chamfer 121 and a molded body chamfer 122, and the two are installed correspondingly to form the first chamfer portion 12. Positions of the molded body chamfer 122 and the circuit board chamfer 121 corresponds to each other, so as to better fit shape and size of the corner of the electronic device. In other words, the circuit board edge portion 44 corresponds to the circuit board chamfer 121, and the molded body edge portion 45 corresponds to the molded body chamfer 122. Preferably, a size range of a minimum equivalent radius R of the first chamfer portion 12 is 0-50 mm, and a corresponding angle range θ is 30°-150°.

Preferably, the electronic components 35 are installed at the edge portion 40 to prevent the electronic components 35 from being damaged during the process of installing the first chamfer portion 12 closely, thereby making room for the formation of the first chamfer portion 12. The electronic components 35 are attached to the circuit board 32 and are electrically connected to the circuit board 32. The electronic components 35 may be one or a combination of a capacitor, a resistor, an inductor, a diode, and a triode.

Furthermore, the edge portion 40 has a top area 41, a side area 42 and a corner edge area 43, wherein the top area 41 is located on a top side of the photosensitive element 31. When the camera module 100 is installed at the upper right corner of the electronic device, the side area 42 is implemented as a right area located at the right side of the photosensitive element 31. When the camera module 100 is installed at the upper left corner of the electronic device, the side area 42 is implemented as a left area located at the left side of the photosensitive element 31.

Correspondingly, when the side area 42 is implemented as a right area, the corner edge area 43 is located on the left side and the bottom side of the photosensitive element 31. When the side area 42 is implemented as a left area, the corner edge area 43 is located at the right side and the bottom side of the photosensitive element 31. The photosensitive element 31 is mostly rectangular. Here, the upper short side is the top and the long side is the side as an example for illustration, which is not a limitation. In this embodiment of the present invention, the two ends of the corner edge area 43 are respectively connected to the top area 41 and the side area 42.

In other words, adjacent ends of the top area 41 and the side area 42 are connected in a chamfered manner to form the first chamfer portion 12. Both ends of the chamfer portion 10 extend straight to form the top area 41 and the side area 42 respectively. When the camera module 100 is installed at the corner of the electronic component, the top area 41 and the side area 42 proximally contact with adjacent side walls of the corner of the electronic component. For example, when the camera module 100 is installed at the upper right corner of the electronic component, the top area 41 is adjacent to the top side wall of the electronic component, and the side area 42 is implemented as a right area and adjacent to the right side wall of the electronic component.

In the first embodiment of the present invention, as shown in FIGS. 2-5, the electronic components 35 are arranged in the side area 42 and/or the corner edge area 43 of the photosensitive assembly 30, so that the photosensitive element 31 may be attached to the circuit board 32 on an upper side, i.e., a width of the top area 41 is narrower relative to other areas (the width is a distance between the edge of the photosensitive chip and the edge of the circuit board). As a result, the optical assembly 20 may be closer to the top side wall of the electronic device, thereby increasing the screen-to-body ratio.

In the first embodiment of the present invention, the outer edge of the optical lens 21 without chamfer is located at inside of the outer edge of the first chamfer portion 12, so the optical lens 21 may not need additional chamfering process, thereby saving process steps.

At this time, the chamfer portion 10 is implemented as the first chamfer portion 12, wherein the first chamfer portion 12 is arranged at a corner of the photosensitive assembly 30 to adapt to the shape of the corner of the electronic device. The electronic components 35 are installed at the edge portion 40, making room for the formation of the first chamfer portion 12. When the camera module 100 is installed at the corner of the electronic device, the first chamfer portion 12 is as close as possible to the edge of the corner of the electronic device, thereby increasing the screen-to-body ratio.

Those skilled in the art may know that the circuit board chamfer 121 of the first chamfer portion 12 may be formed before molding the molded body 33, or may be formed after molding the molded body 33 and before installing the optical lens 21; of course, it may also be formed after installing the optical lens 21, and the sequence of the steps does not affect the final structure of the present invention.

Furthermore, the optical lens 21 of the optical assembly 20 may be installed at top of the molded body 33 by using an installation surface 23. The installation surface 23 is arranged at bottom of the optical lens 21, and its size and shape correspond to the contour of the molded body 33, so that the optical lens 21 is stably fixed to the photosensitive assembly 30 through the installation surface 23. The installation surface 23 corresponds to the light window 331, and is arranged with a through hole for light to pass through.

Correspondingly, the installation surface 23 has an installation chamfer 231, wherein the installation chamfer 231 corresponds to the molded body chamfer 122, and is arranged at a corner of the installation surface 23. In other words, during the installation process, the installation chamfer 231 corresponds to the molded body chamfer 122, and the through hole corresponds to the light window 331. Particularly, the installation chamfer 231 may be formed by cutting, or may be formed through injection molding by using a mold having chamfer.

Figure 12:
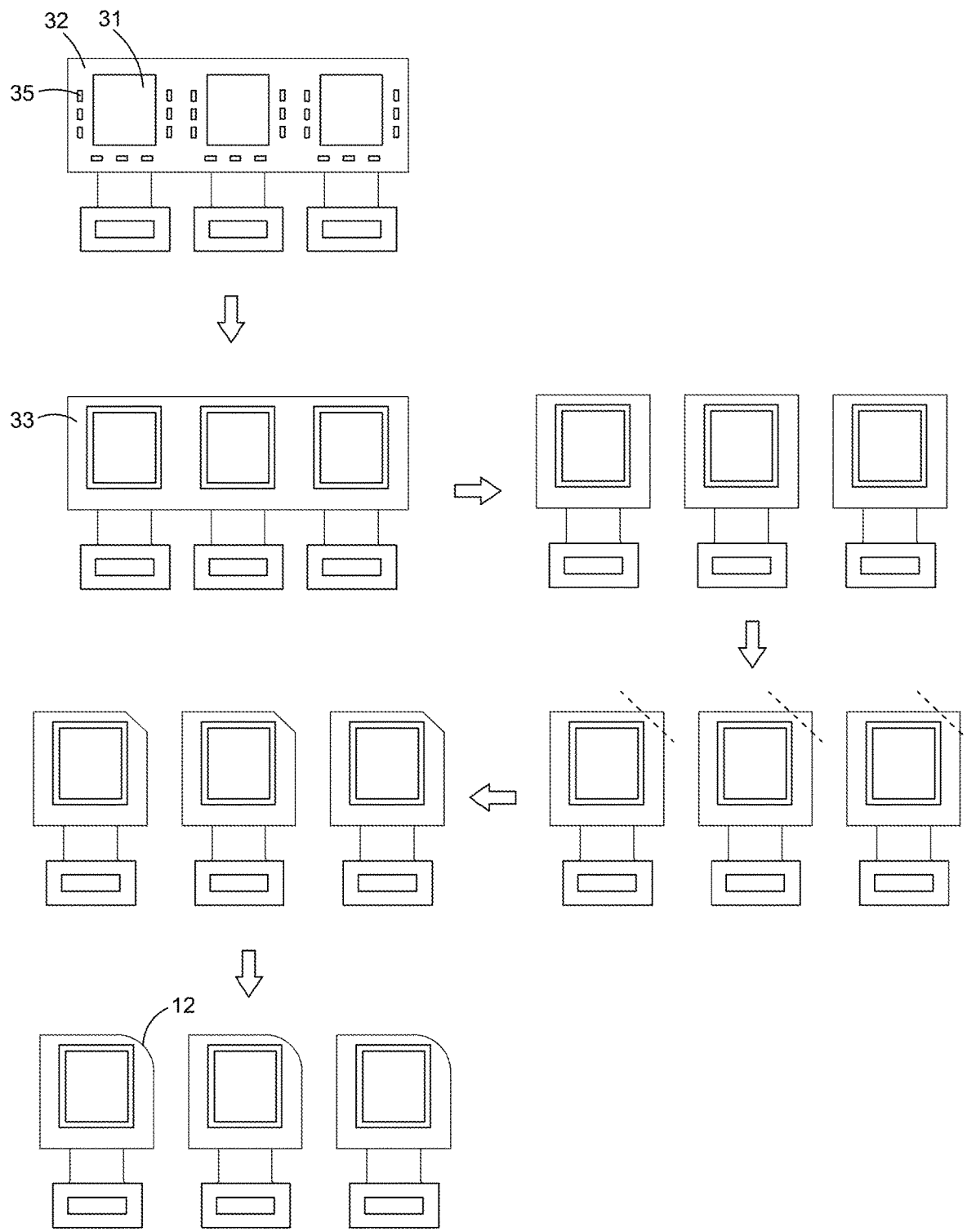
FIG. 12 is a flow chart of a preparation method of a photosensitive assembly of a camera module according to the present invention.
Figure 13:
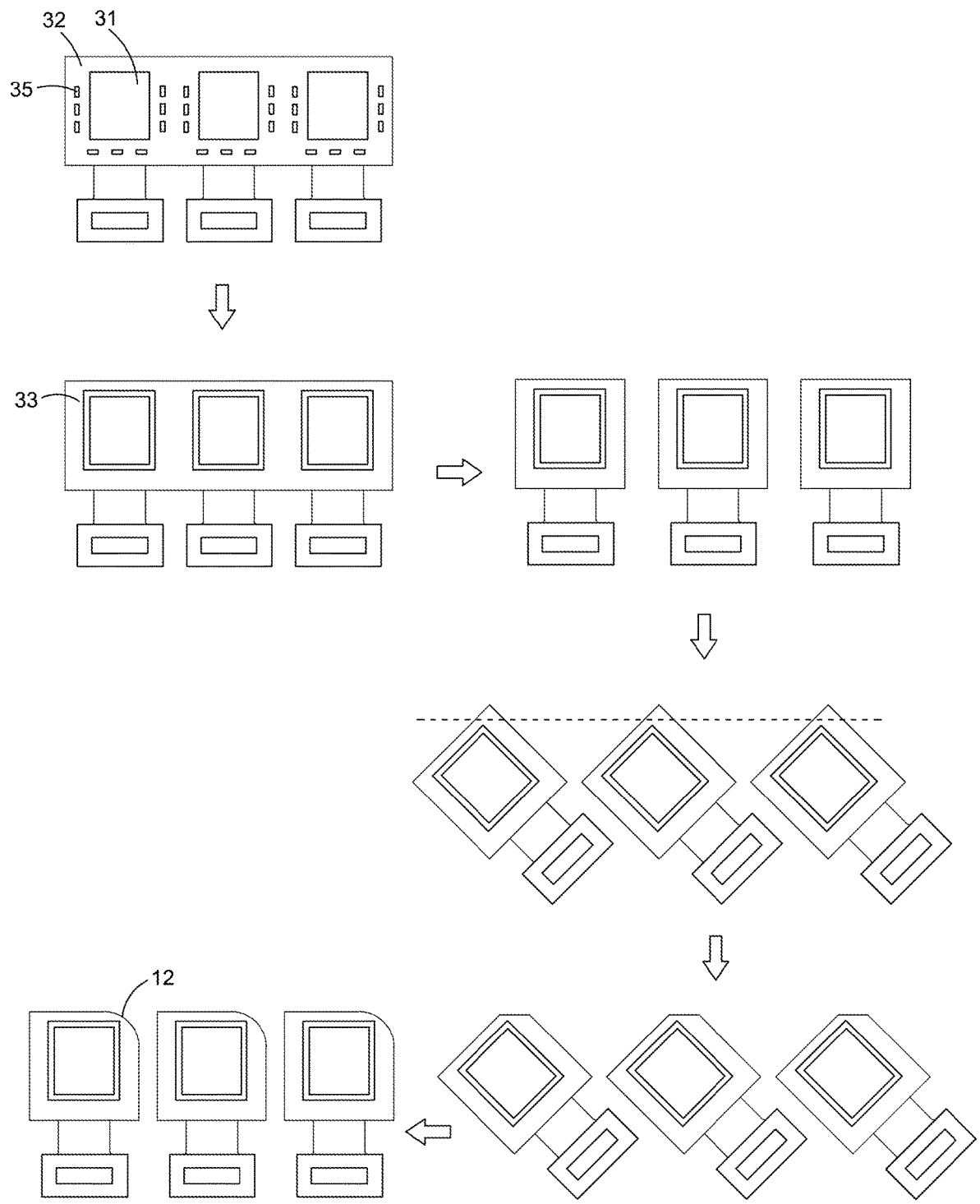
FIG. 13 is a flow chart of a preparation method of a photosensitive assembly of a camera module according to the present invention.

Particularly, there are many preparation methods for the first chamfer portion 12, for example:

In a first preparation method of the present invention, the photosensitive element 31 and the circuit board 32 are integrally combined through a molding process to form a photosensitive assembly jointed panel, and photosensitive assembly jointed panel is consists of a plurality of connected photosensitive assemblies 30, as shown in FIGS. 12 and 13, the photosensitive assembly jointed panel is cut to form a plurality of photosensitive assembly monomers without the first chamfer portion 12, and after cutting, the photosensitive assembly 30 is made to form the first chamfer portion 12.

In one embodiment of the present invention, after the photosensitive assembly jointed panel is cut to form a plurality of photosensitive assembly monomers without the first chamfer portion 12, the photosensitive assembly monomers without the first chamfer portion 12 are rearranged so that cutting lines of the first chamfer portion 12 are on a same straight line, and multiple photosensitive assemblies may be cut at one time, thereby improving production efficiency. It is understandable that the photosensitive assembly monomers without the first chamfer portion 12 may be cut one by one to form the first chamfer portion 12 of the photosensitive assembly 30, as shown in FIG. 13.

It is worth mentioning that when a plurality of photosensitive assembly monomers 30 are uniformly cut, the first chamfer portion 12 is preferably implemented as an inclined edge, i.e., a plurality of photosensitive assembly monomers 30 are placed at same angle for the convenience of mass production. When the photosensitive assemblies 30 are cut one by one, each monomer may be cut into different shapes according to different needs. It is understandable that it is also possible to cut a plurality of the photosensitive assemblies 30 at same time to form the inclined edges, and then process the inclined edges one by one to form the required shape of the chamfer.

At this time, the circuit board chamfer 121 and the molded body chamfer 122 are both cut to form the first chamfer portion 12 after the photosensitive assembly 30 is formed integrally, as shown in FIG. 12. That is to say, a manufacturer may use an original mold without changing the shape of the mold, and the photosensitive assembly 30 without chamfer formed after molding is processed by cutting, or grinding, or other suitable processes, so as to form the first chamfer portion 12, thereby reducing cost of reshaping the mold.

Figure 14:
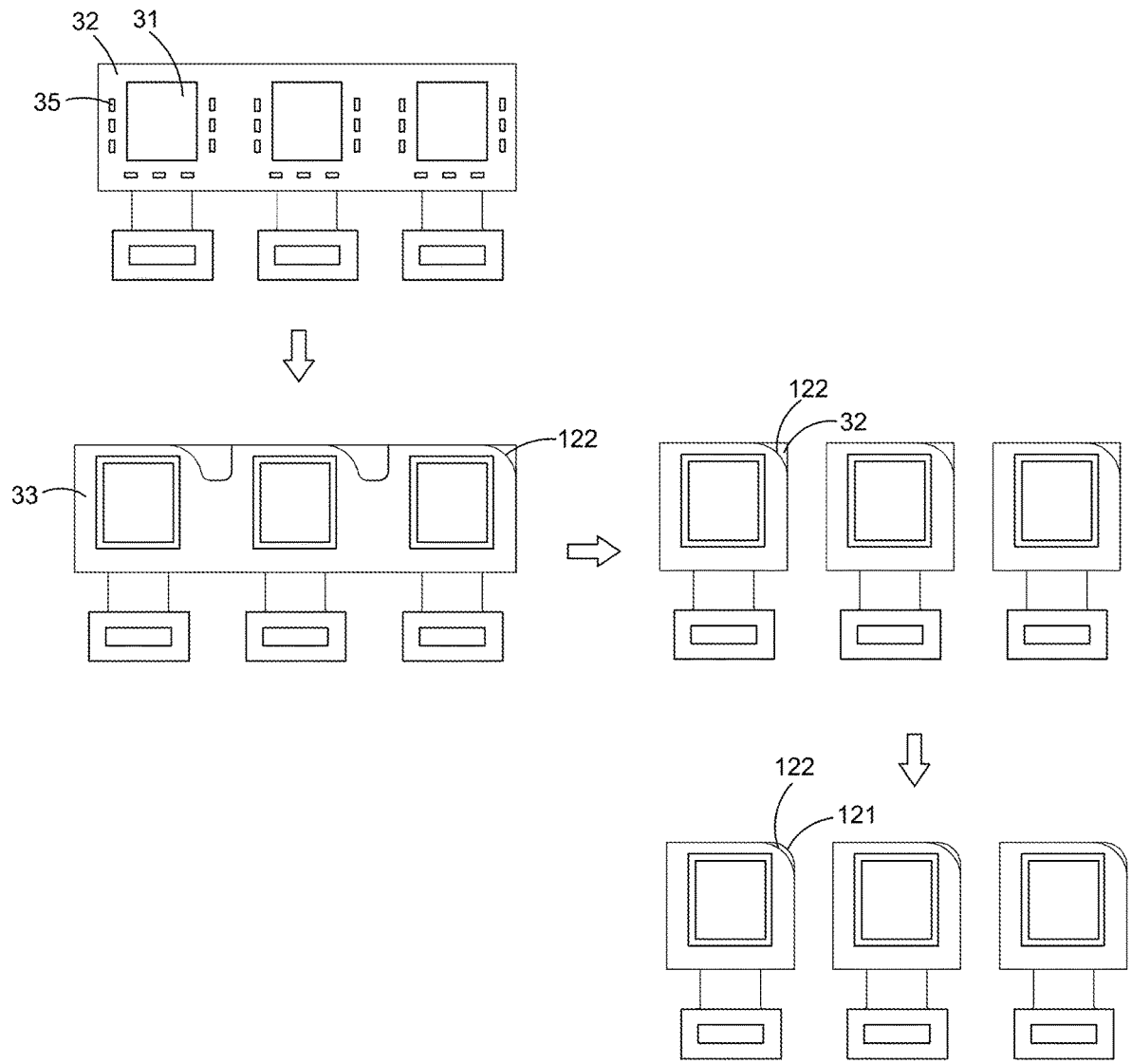
FIG. 14 is a flow chart of a preparation method of a photosensitive assembly of a camera module according to the present invention.
Figure 15:
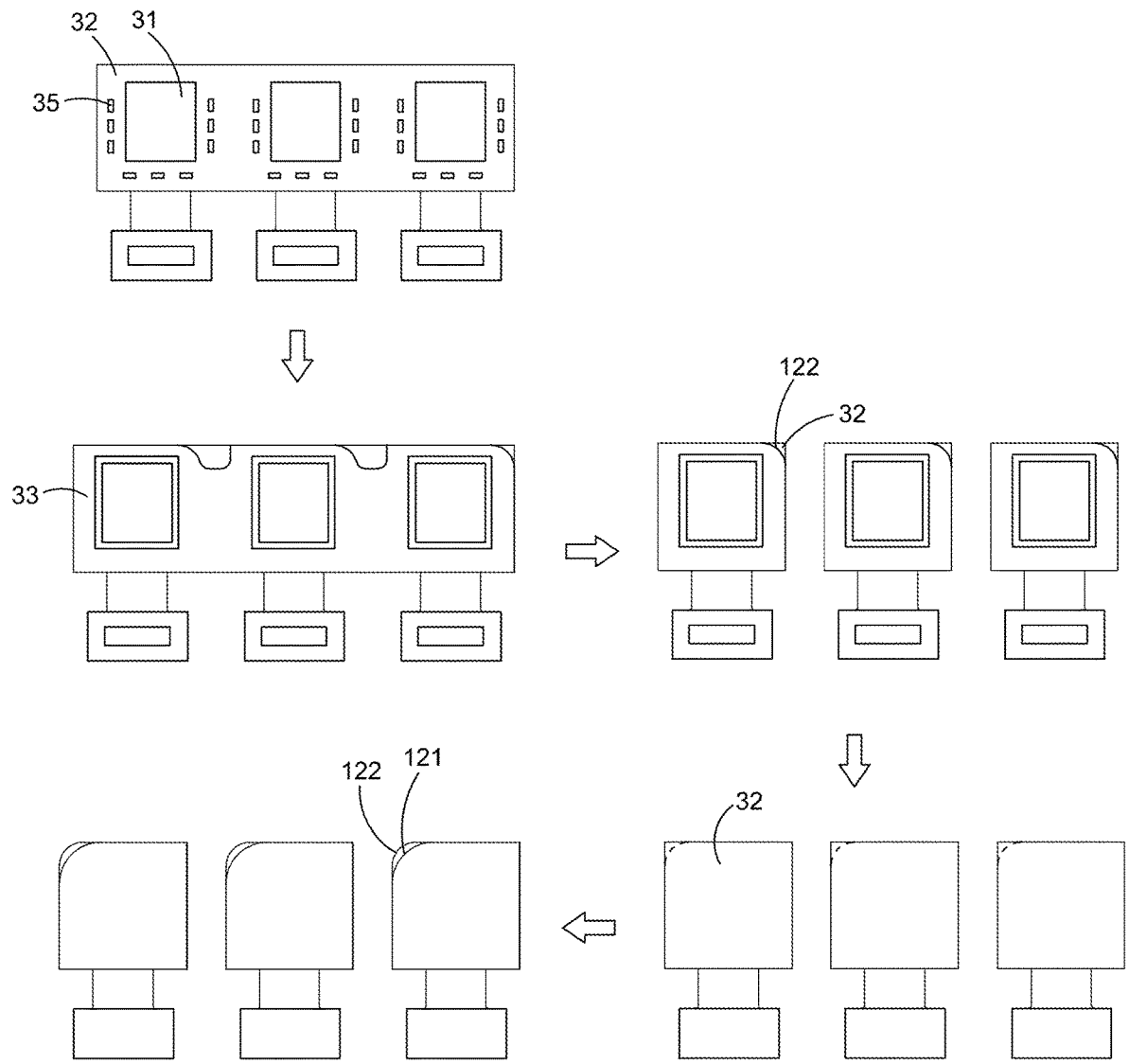
FIG. 15 is a flow chart of a preparation method of a photosensitive assembly of a camera module according to the present invention.

In a second preparation method of the present invention, as shown in FIGS. 14 and 15, the mold is designed to have a chamfer shape, i.e., the molded body 33 of integrally combining the photosensitive element 31 and the circuit board 32 is formed by molding with a mold having chamfer, and the molded body 33 has the molded body chamfer 122 after being formed by a molding process. At this time, a photosensitive assembly jointed panel with sequentially connected photosensitive assemblies 30 is obtained by the molding process, and the photosensitive assembly monomers 30 is obtained by cutting the photosensitive assembly jointed panel having the molded body chamfer 122.

Furthermore, in this second method, since the mold used in the molding process has a chamfer structure, the mold not only has to press the circuit board on the top and bottom sides of the circuit board to prevent the molding material from overflowing, it is also necessary to press the circuit board at the chamfer of the circuit board, thereby obtaining the molded body 33 having the molded body chamfer 122. Therefore, in this embodiment, the circuit board 32 does not have a chamfer before molding, i.e., the circuit board 32 is not chamfered before molding, and it is a complete square circuit board for supporting the pressure head of the mold and cooperating with the mold to form a closed molding cavity.

In the second preparation method of the present invention, the circuit board 33 may be cut from a front face of the circuit board 32, as shown in FIG. 14, i.e., the surface where the molded body 33 is molded. Since the circuit board is cut by a saw blade or laser or other processes, there are certain errors in the process, so in order to avoid cutting the molded body 33 and the internal elements encapsulated in the molded body 33, such as electronic components, photosensitive elements, or gold wires, a certain safety distance must be reserved between the preset cutting line and the molded body chamfer 122 during cutting, as shown in the figure, so as to ensure that in the error range, the molded body 33 and the internal elements of the molded body 33 will not be cut. That is to say, preferably, the outer edge of the molded body chamfer 122 is located at inside of the edge of the circuit board chamfer 121, and the size of the circuit board chamfer 121 is equal to or slightly larger than that of the molded body chamfer 122, as shown in FIG. 14.

When cutting from the front face of the circuit board 32, the reserved safety distance is 0.01-0.5 mm. That is to say, when the outer edge of the molded body chamfer 122 is located at inside of the edge of the circuit board chamfer 121, a distance between them is 0.01-0.5 mm.

Figure 11:
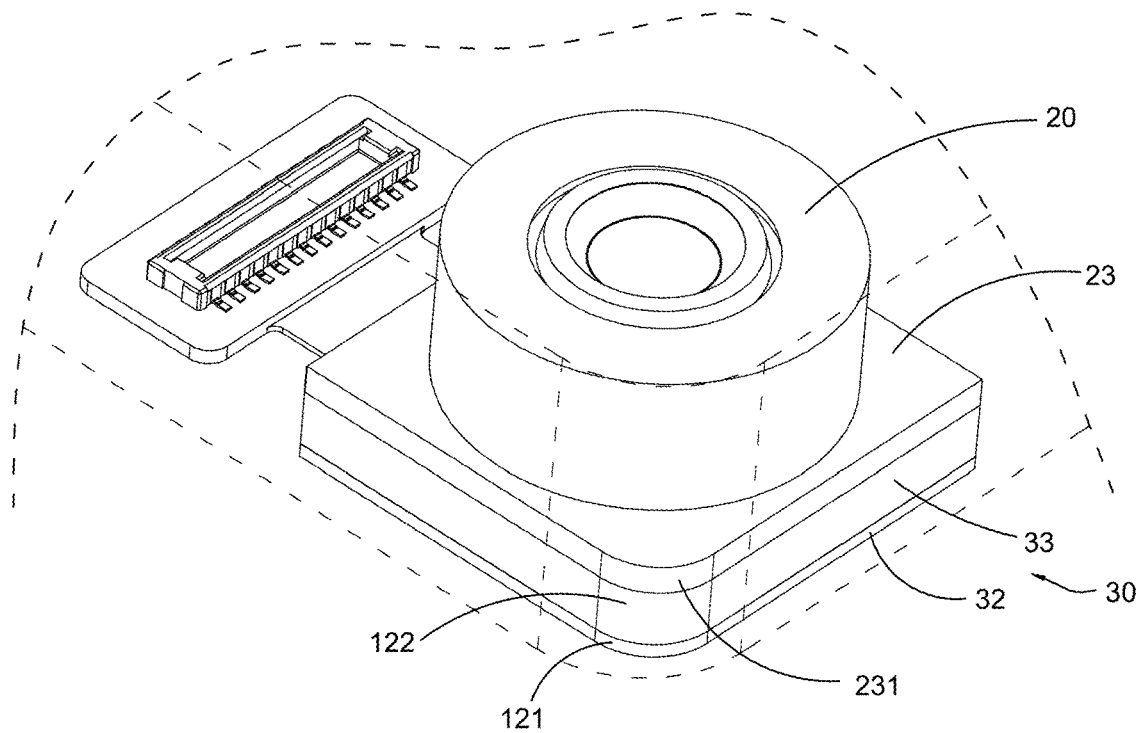
FIG. 11 is a perspective view of a camera module according to another embodiment of the present invention.

In the second preparation method of the present invention, the circuit board 32 may also be cut from a back face of the circuit board 32, as shown in FIG. 15, i.e., the surface without the molded body 33. When the circuit board 32 is cut from the back face, since the molded body 33 is not formed on the back face, and the elements such as electronic components and gold wires are basically not arranged, it is no longer necessary to consider the problem of cutting the molded body 33 and the internal components of the molded body 33 due to cutting errors. By controlling the cutting depth, it may be avoided to cut the molded body 33 and the internal components of the molded body 33. Therefore, a preset cutting line may correspond to the position of the molded body chamfer 122 during cutting process, i.e., the edge of the circuit board chamfer 121 obtained after cutting is flush with the edge of the molded body chamfer 122, as shown in FIG. 11.

Figure 7:
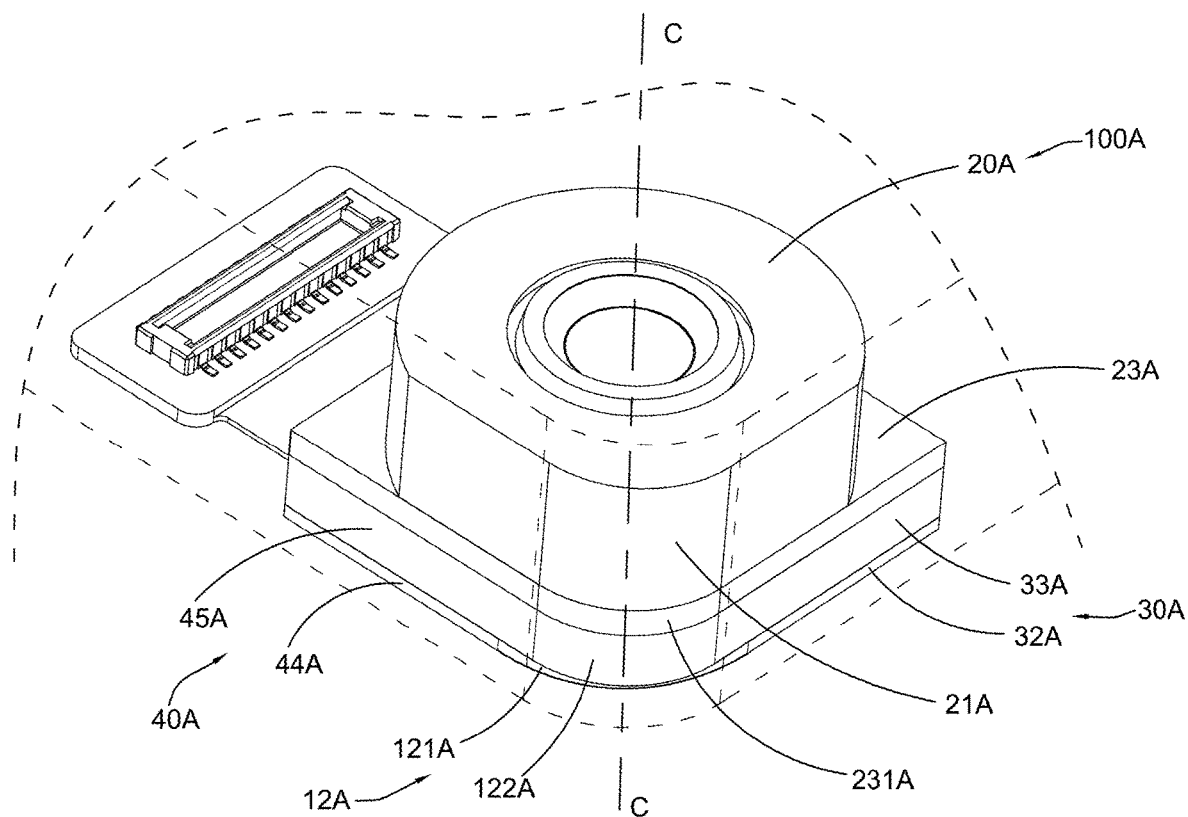
FIG. 7 is a perspective view of a camera module according to a second embodiment of the invention.
Figure 8:
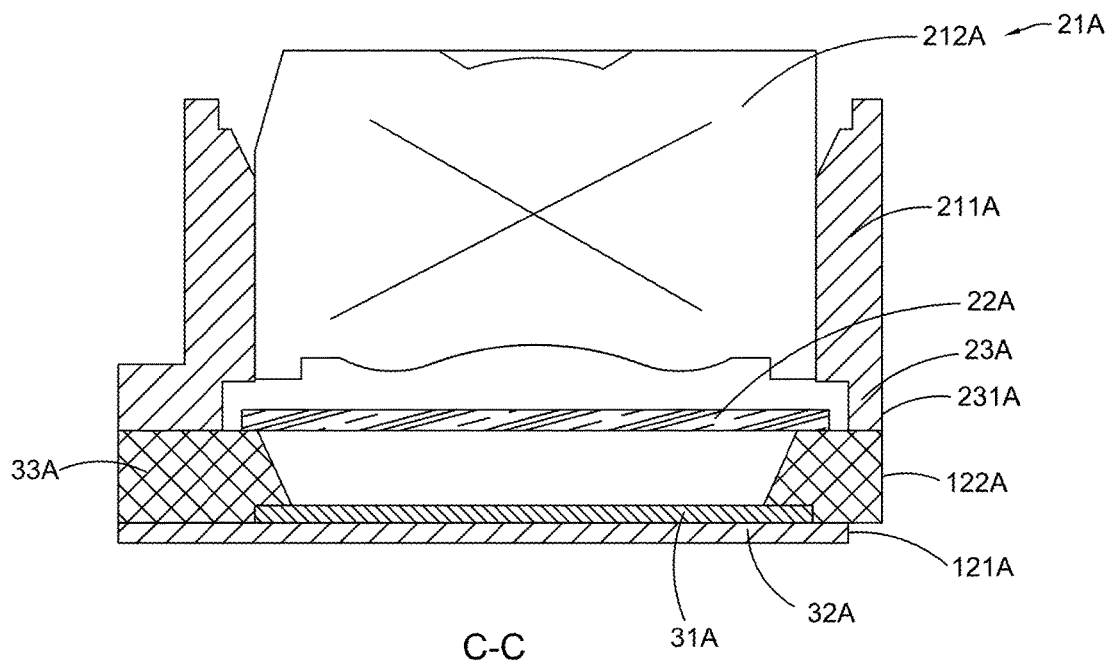
FIG. 8 is a schematic structural diagram of the camera module according to the above second embodiment of the present invention.
Figure 9:
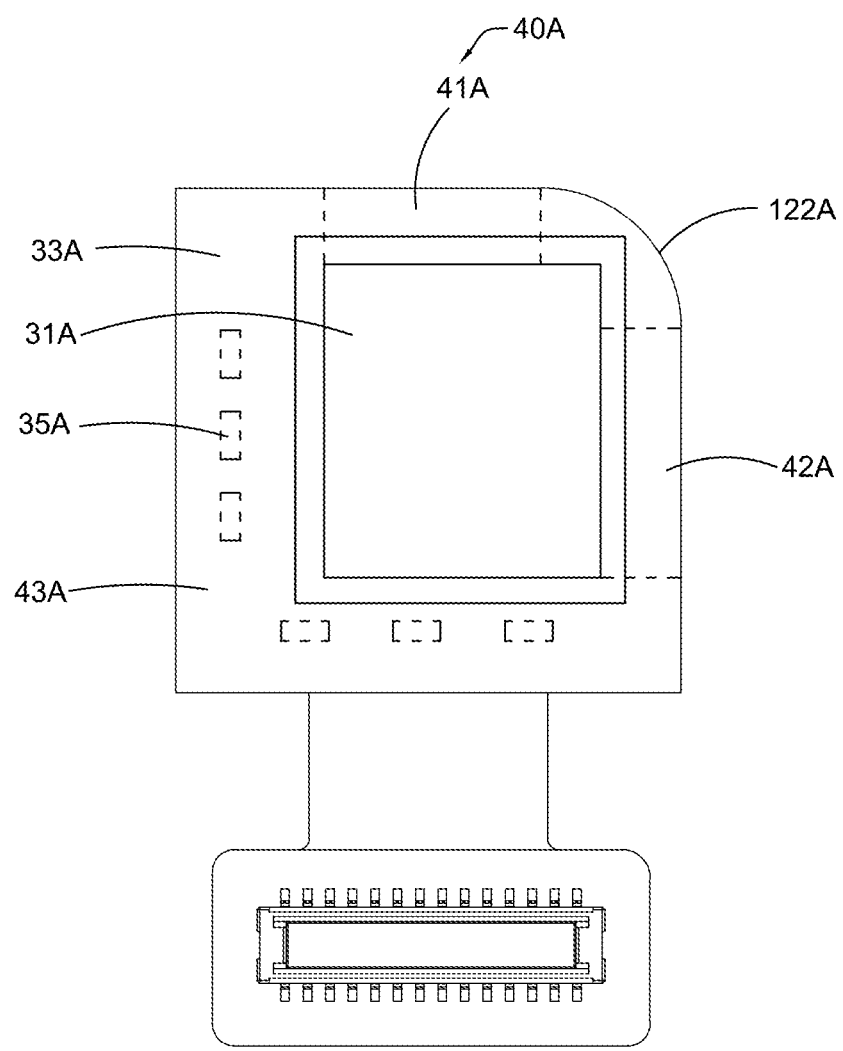
FIG. 9 is a top view of a photosensitive assembly of the camera module according to the above second embodiment of the present invention.
Figure 10:
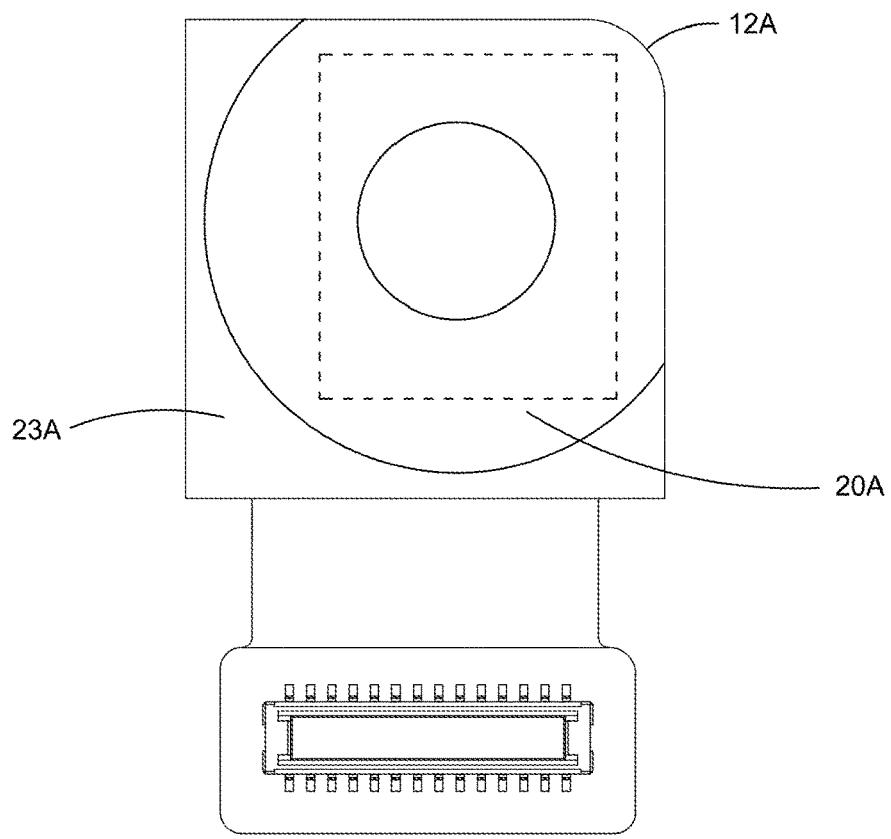
FIG. 10 is a top view of the camera module according to the above second embodiment of the present invention.

Further, when cutting the circuit board 32 from the back face, the preset cutting line may also be located at inside of the edge of the molded body chamfer 122 during cutting process, i.e., the size of the circuit board chamfer 121 after cutting is smaller than that of the molded body chamfer 122, i.e., the outer edge of the circuit board chamfer 121 is located at inside of the molded body chamfer 122, so as to prevent mutual interference between the bottom of the circuit board 32 and the frame or arc-shaped housing of the electronic device, when the camera module 100 is installed in the electronic device, as shown in FIG. 7.

Furthermore, when cutting the circuit board 32 from the back face, not only the chamfers of the circuit board 32 may be cut, but also the top and side edges of the circuit board 32 may be cut, so that the top and side edges of the circuit board 32 are both retracted to the bottom of the molded body 33 to fit the shape of the housing of the electronic device, and the camera module 100 may be closer to the edge of the electronic device. That is to say, the top outer edge of the circuit board edge portion may be cut to be located at inside of the top outer edge of the molded body edge portion. Alternatively, the outer peripheral edge of the circuit board edge portion may be cut to be located at inside of the outer peripheral edge of the molded body edge portion.

It is worth mentioning that when the molded body chamfer 122 is formed by molding with a mold having a chamfer, and the molded bodies 33 are molded at intervals so as to avoid the formation of sharp corners, etc. by the edge portion of the previous molded body and the subsequent molded body chamfer 122 and thereby hindering drafting of the molds. That is to say, a transition portion is arranged between adjacent molds to space the adjacent molded bodies 33 for the convenience of drafting the molds, as shown in FIGS. 14 and 15.

Figure 16:
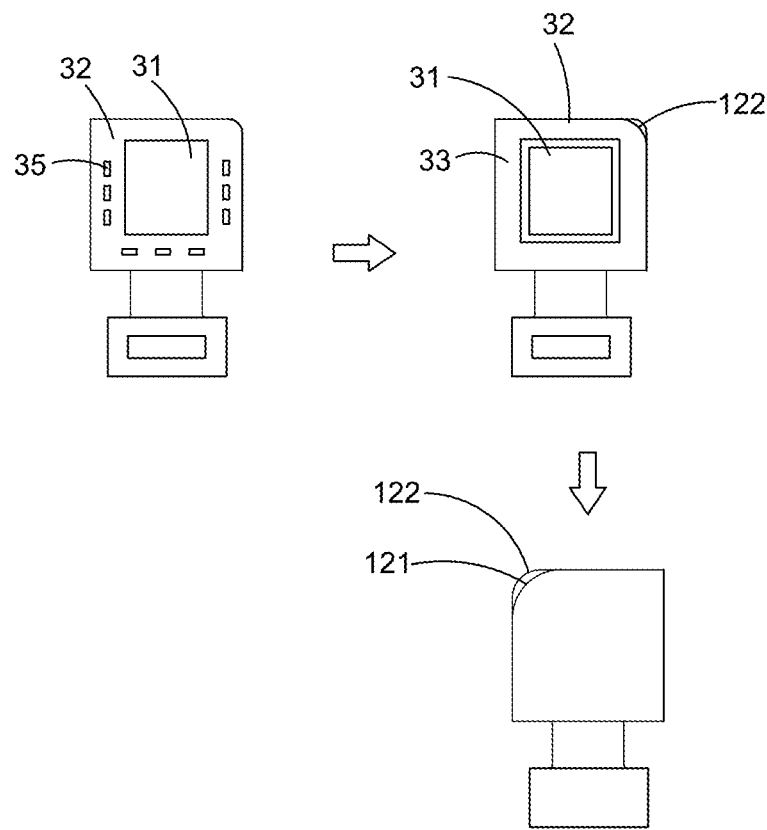
FIG. 16 is a flow chart of a preparation method of a photosensitive assembly of a camera module according to the present invention.

In a third preparation method of the present invention, as shown in FIG. 16, the circuit board chamfer 121 is formed before the molded body 33 is molded, so as to avoid dust generation in the subsequent cutting process. For example, the circuit board 32 having the circuit board chamfer 121 may be directly purchased in practical production, or the manufacturer producing the camera module 100 may perform cutting, stamping, laser cutting and other processes in advance to form it from a circuit board 32 without the circuit board chamfer 121.

Further, in the third solution, preferably, the mold is designed to have a chamfer shape. By using a mold arranged with a chamfer for molding, a molded body 33 integrally combined the photosensitive element 31 and the circuit board 32 is formed. The molded body 33 has the molded body chamfer 122 after the molding process. At this time, the chamfer of the mold corresponds to the circuit board chamfer 121 during the molding process, so that the formed molded body chamfer 122 corresponds to the position of the circuit board chamfer 121.

In addition, in order to form a closed molding space and prevent the molding material from overflowing, each side of the mold needs to be pressed onto the circuit board 32. In other words, the circuit board chamfer 121 needs to provide a pressing place for the chamfer of the mold, and the circuit board chamfer 121 protrudes relative to the molded body chamfer 122, i.e., the outer edge of the molded body chamfer 122 is located at inside of the outer edge of the circuit board chamfer 121. Of course, those skilled in the art may further preset a cutting depth according to needs, and cut from the back face of the circuit board 32, so that the outer edge of the molded body chamfer 122 is located at outside of the outer edge of the circuit board chamfer 121.

Preferably, when the first chamfer portion 12 is implemented as a round corner, laser cutting is used. When the first chamfer portion 12 is implemented as a bevel edge, a knife or laser cutting may be used, and the present invention is not limited thereto.

In a second embodiment of the present invention, as shown in FIGS. 7-10, a camera module 100A includes an optical assembly 20A and a photosensitive assembly 30A, wherein the photosensitive assembly 30A includes a photosensitive element 31A, a circuit board 32A, a molded body 33A and a series of electronic components 35A, wherein the optical assembly 20A includes an optical lens 21A and a light-transmitting element 22A. The photosensitive assembly 30A has a first chamfer portion 12A and an edge portion 40A, wherein the edge portion 40A has a top area 41A, a side area 42A, and a corner edge area 43A. Correspondingly, the circuit board 32A has a circuit board edge portion 44A and a circuit board chamfer 121A, and the molded body 33A has a molded body chamfer 122A and a molded body edge portion 45A. The optical assembly 20A includes an optical lens 21A and/or a light-transmitting element 22A, and the optical lens 21A may be further installed at the photosensitive assembly 30A through an installation surface 23A.

Those skilled in the art may know that in the first preferred embodiment described above, the order of forming a round chamfer, multiple chamfers, and a circuit board chamfer is not limited, the molding process of the molded body chamfer is not limited, and the outer edge of the lens holder chamfer is located at inside of the edge of the circuit board chamfer, or is flush with the edge of the circuit board chamfer, or located at outside of the edge of the circuit board chamfer, and the electronic components are preferentially installed at the edge portion, etc., these features are also applicable in this embodiment and may be combined with the features of this embodiment, and they will not be repeated here.

The difference from the above-mentioned embodiment is that in this embodiment, the electronic components 35A are installed at the corner edge area 43A, so that the photosensitive element 31A may be attached to the circuit board 32A obliquely. i.e., at this time, a width of the top area 41A and the side area 42A is narrower than that of other areas (the width is a distance from the edge of the circuit board to the edge of the photosensitive element), and the optical assembly 20A may be closer to two side walls of the corner of the electronic device, thereby increasing the screen-to-body ratio. Taking the camera module 100A installed at an upper right corner of the electronic device as an example, the photosensitive element 31A may be attached to the circuit board 32A at upper and right sides, and the top area 41A and the right area 42A are narrower relative to other areas, and the optical assembly 20A may be closer to the upper right corner of the electronic device.

The electronic components 35A are installed at the corner edge area 43A, making room to form the first chamfer portion 12A. Those skilled in the art may know that the first chamfer portion 12A may be formed by the method described in the first embodiment, and it will not be repeated here.

In this embodiment, the optical lens 21A without a chamfer is located at inside of the outer edge of the first chamfer portion 12A, and the optical lens 21A needs chamfering process to form a second chamfer portion 11A, wherein arranged positions, shapes and sizes of the first chamfer portion 12A and the second chamfer portion 11A are same as each other.

The second chamfer portion 11A is formed on a lens carrier 211A of the optical lens 21A, wherein the lens carrier 211A carries a lens 212A for being supported by the photosensitive assembly 30A. The second chamfer portion 11A may be formed through an injection molding process by using a mold with a chamfer design.

When the optical lens 21A is installed by using the installation surface 23A, the installation surface 23A may stabilize the obliquely installed optical lens 21A to the photosensitive assembly 30A. At this time, an installation chamfer portion 231 of the installation surface 23A and the second chamfer portion 11A may be formed by an injection molding process by using a mold with a chamfering design at the same time. That is to say, in this embodiment, positions of the second chamfer portion 11A, the installation chamfer portion 231A, and the molded body chamfer 122A correspond to each other.

Further, in order to increase the screen-to-body ratio, the second chamfer portion 11A and the first chamfer portion 12A are as close as possible to the adjacent side walls of the corner of the electronic device. Taking the optical lens 21A installed at the upper right corner of the electronic device as an example, in the second embodiment, the adjacent side of the second chamfer portion 11A of the optical lens 21A is a straight side, for example, the top side and the right side of the second chamfer portion 11A are set as straight sides, so as to be as close as possible to the top side wall and the right side wall of the corner of the electronic device, thereby increasing the screen-to-body ratio. Compared with the first embodiment, the optical lens 21A is less restricted when it is as close as possible to the corner.

Alternatively, one of the adjacent sides of the second chamfer portion 11A is implemented as a straight side. For example, when the optical lens 21A is arranged only deviated upward or rightward, the top side or right side of the second chamfer portion 11A is set as a straight side, so that it may be as close as possible to the top or right side wall of the corner of the electronic device.

Of course, those skilled in the art may know that arranged position, eccentricity, eccentric direction of the photosensitive element 31, or whether it is arranged as a deviated one etc. may be determined according to actual needs, and the electronic components may also be arranged at the edge portion as needed, the present invention is not limited thereto, and the above-mentioned embodiments are only examples for illustration and not limitation. For example, the photosensitive element 31 may also be arranged slightly eccentrically, and there is still room for the electronic components in the top area.

Those skilled in the art should understand that the above description and the embodiments of the present invention shown in the drawings are only examples and do not limit the present invention. The purpose of the present invention has been completely and effectively achieved. The functions and structural principles of the present invention have been shown and explained in the embodiments. Without departing from the principles, the embodiments of the present invention may have any deformation or modification.

The invention claimed is:

1. A photosensitive assembly for a camera module having a chamfer comprising:
   a photosensitive element;
   a circuit board including a circuit board chamfer, the photosensitive element being electrically connected and attached to the circuit board; and
   a molded body including a light window providing a light path for the photosensitive element and a molded body chamfer,
   wherein the molded body chamfer and the circuit board chamfer are correspondingly arranged to form a first chamfer portion with a round shape that matches a round shape of a corner of the camera module and is different from a non-round shape of other corners of the camera module which does not match the round shape of the corner of the camera module,
   the round shape of the corner of the camera module is suitable for being installed at a corner of an outer frame of an electronic device with a round shape which is directly contactable or visible by a user when the electronic device is used such that the round shape of the corner of the outer frame of the electronic device is closer to the round shape of the first chamfer portion than the non-round shape of the other corners of the camera module, and
   the molded body is molded on the circuit board and encapsulates the photosensitive element.

2. The photosensitive assembly according to claim 1, wherein positions for arranging the circuit board chamfer and the molded body chamfer correspond to each other, and an outer edge of the circuit board chamfer is located at inside of an outer edge of the molded body chamfer, and the circuit board chamfer and the molded body chamfer form the first chamfer portion.

3. The photosensitive assembly according to claim 1, wherein positions for arranging the circuit board chamfer and the molded body chamfer and their shapes correspond to each other, outer edges of the circuit board chamfer and the molded body chamfer are flush with each other, and the circuit board chamfer and the molded body chamfer form the first chamfer portion.

4. The photosensitive assembly according to claim 1, wherein positions for arranging the circuit board chamfer and the molded body chamfer correspond to each other, an outer edge of the circuit board chamfer is located at outside of an outer edge of the molded body chamfer, and the circuit board chamfer and the molded body chamfer form the first chamfer portion.

5. The photosensitive assembly according to claim 4, wherein a distance between the outer edge of the circuit board chamfer and the outer edge of the molded body chamfer is 0.01-0.5 mm.

6. The photosensitive assembly according to claim 1, further having two first chamfer portions, wherein the first chamfer portions are respectively arranged at two opposite corners of the camera module.

7. The photosensitive assembly according to claim 1, further including a series of electronic components, wherein the electronic components are electrically connected to the circuit board, and the molded body encapsulates the electronic components on the circuit board; and
   the circuit board and the molded body correspondingly have a circuit board edge portion and a molded body edge portion to form an edge portion, wherein an area formed by the edge portion and the first chamfer portion is defined by the outer edge of the photosensitive element and the edge of the circuit board, and the electronic components are electrically connected to and installed at the circuit board edge portion, and the molded body edge portion encapsulates the electronic component on the circuit board edge portion.

8. The photosensitive assembly according to claim 7, wherein,
   a top outer edge of the circuit board edge portion is located at inside of a top outer edge of the molded body edge portion, and/or
   a side outer edge of the circuit board edge portion is located at inside of a side outer edge of the molded body edge portion.

9. The photosensitive assembly according to claim 7, wherein the edge portion has a top area, a side area, and a corner edge area, wherein adjacent ends of the top area and the side area are connected in a chamfered manner to form the first chamfer portion, and a width of the top area is narrower than widths of the side area and the corner edge area, and the electronic components are installed at the side area and/or the corner edge area.

10. The photosensitive assembly according to claim 7, wherein the edge portion has a top area, a side area, and a corner edge area, and widths of the top area and the side area are narrower than a width of the corner edge area, and the electronic components are installed at the corner edge area.

11. The photosensitive assembly according to claim 1, wherein a minimum equivalent radius value of the first chamfer portion is greater than zero and less than or equal to 50 mm.

12. The photosensitive element according to claim 1, wherein an angle range θ value of the first chamfer portion is greater than or equal to 30° and less than or equal to 150°.

13. A camera module having a chamfer and suitable for an electronic device, comprising:
   at least one chamfer portion suitable for being installed at a corner of the electronic device;
   an optical assembly; and
   a photosensitive assembly according to claim 1, wherein the first chamfer portion is used to form the chamfer portion, and the molded body supports the optical assembly to be corresponding to a photosensitive path of the photosensitive element.

14. The camera module according to claim 13, wherein an optical lens has a second chamfer portion, and positions of the first chamfer portion and the second chamfer portion correspond to each other to form the chamfer portion.

15. The camera module according to claim 14, wherein one of two adjacent sides of the second chamfer portion is implemented as a straight side, so that the second chamfer portion is attached to a side wall of the corner of the electronic device.

16. The camera module according to claim 14, wherein two adjacent sides of the second chamfer portion are implemented as straight sides, so that the second chamfer portion is attached to two side walls of the corner of the electronic device.

17. The camera module according to claim 14, wherein the optical assembly further includes an installation surface, and the installation surface is arranged on a bottom surface of the optical lens, and the installation surface is installed at top of the molded body.

18. The camera module according to claim 17, wherein the installation surface includes an installation chamfer, and the installation chamfer is formed on the installation surface and corresponds to the molded body chamfer.

19. An electronic device, characterized by comprising:
   a device body; and
   a camera module having a chamfer according to claim 13, wherein the camera module is installed at a corner of an outer frame of the device body with a round shape which is directly contactable or visible by a user when the electronic device is used.

* * * * *